United States Patent Office 3,813,330
Patented May 28, 1974

3,813,330
PROCESS FOR AROMATIZING OLEFINS IN THE PRESENCE OF EASILY CRACKED PARAFFINS
Edwin N. Givens, Pitman, Charles J. Plank, Woodbury, and Edward J. Rosinski, Deptford, N.J., assignors to Mobil Oil Corporation
Filed Mar. 5, 1973, Ser. No. 337,971
Int. Cl. C10g 37/10
U.S. Cl. 208—66                                      7 Claims

ABSTRACT OF THE DISCLOSURE

Process for aromatizing a feedstock, which may be liquid or gaseous and is hydrocarbon in nature having a boiling range of about $C_2$ to 400° F. by contacting the feedstock with a ZSM-5 type of catalyst under aromatization conditions whereby making a mixed gas and liquid product, separating the gas and liquid fractions of the product, subjecting the gas fraction to dehydrogenative cracking to increase the proportion of olefins and light gases therein, separating and recycling the olefin rich portion to admixture with the original feedstock, and recovering liquid gasoline of very high octane.

---

Figure 1:
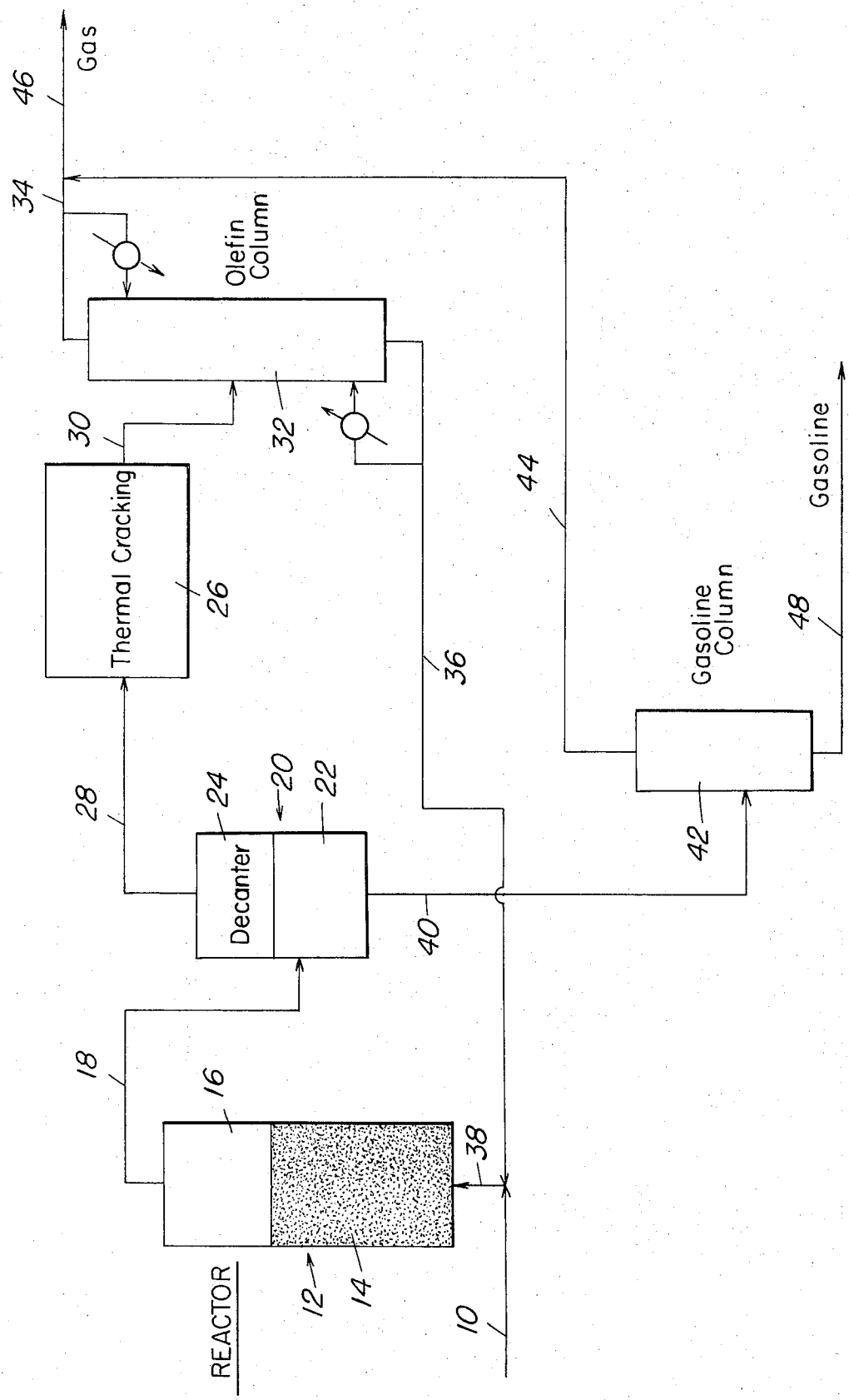

This invention relates to the production of very high octane gasoline. It more particularly refers to the aromatization of an aliphatic feed in exceptionally high yields.

There has recently been developed new technology on the aromatization of aliphatics. This technology is based on the use of a particular class of synthetic alumino silicate zeolite molecular sieves of the ZSM-5 type which may or may not have additional or alternative metal and/ or other cationic components therein.

The catalyst used for this known process has been stated to be a ZSM-5 type of catalyst which includes ZSM-5, ZSM-8, and ZSM-11 and other similarly behaving zeolites.

ZSM-5 is disclosed and claimed in copending application Ser. No. 865,472, filed Oct. 10, 1969, now U.S. Pat. 3,702,886; ZSM-8 is disclosed and claimed in copending application Ser. No. 865,418, filed Oct. 10, 1969, now abandoned and ZSM-11 is disclosed and claimed in copending application Ser. No. 31,421, filed Apr. 23, 1970, now U.S. Pat. 3,709,979.

The family of ZSM-5 compositions has the characteristic X-ray diffraction pattern set forth in Table 1 hereinbelow. ZSM-5 compositions can also be identified, in terms of mole ratios of oxides, as follows:

$$0.9 \pm 0.2 \; M_{2/n}O : W_2O_3 : b \; YO_2 : z \; H_2O$$

wherein M is a cation, n is the valence of said cation, W is selected from the group consisting of aluminum and gallium, Y is selected from the group consisting of silicon and germanium, z is from 0 to 40 and b is at least 5 and preferably 15–300.

In a preferred synthesized form, the zeolite has a formula, in terms of mole ratios of oxides, as follows:

$$0.9 \pm 0.2 \; M_{2/n}O : Al_2O_3 : 15-100 \; SiO_2 : z \; H_2O$$

and M is selected from the group consisting of a mixture of alkali metal cations, especially sodium, and alkylammonium cations, the alkyl groups of which preferably contain 2–5 carbon atoms.

In a preferred embodiment of ZSM-5, W is aluminum, Y is silicon and the silica/alumina mole ratio is at least 15, preferably at least 30.

Members of the family of ZSM-5 zeolites which include ZSM-5, ZSM-8 and ZSM-11 possess a definite distinguishing crystalline structure whose X-ray diffraction pattern shows the following significant lines:

TABLE 1

| Interplanar spacing $d$(A): | Relative intensity |
|---|---|
| 11.1±0.2 | S |
| 10.0±0.2 | S |
| 7.4±0.15 | W |
| 7.1±0.15 | W |
| 6.3±0.1 | W |
| 6.04±0.1 | W |
| 5.97±0.1 | W |
| 5.56±0.1 | W |
| 5.01±0.1 | W |
| 4.60±0.08 | W |
| 4.25±0.08 | W |
| 3.85±0.07 | VS |
| 3.71±0.05 | S |
| 3.64±0.05 | M |
| 3.04±0.03 | W |
| 2.99±0.02 | W |
| 2.94±0.02 | W |

These values, as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, 100 $I/I_o$, where $I_o$ is the intensity of the strongest line or peak and $d$(obs.), the interplanar spacing in A, corresponding to the recorded lines, were calculated. In Table 1 the relative intensities are given in terms of the symbols S=strong, M=medium, MS=medium strong, MW=medium weak and VS=very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur, depending on the silicon to aluminum ratio of the particular sample, as well as if it has been subjected to thermal treatment.

| As made | HCl | NaCl | CaCl₂ | ReCl₃ | AgNO₃ |
|---|---|---|---|---|---|
| 11.15 | 11.16 | 11.19 | 11.19 | 11.19 | 11.19 |
| 10.01 | 10.03 | 10.05 | 10.01 | 10.6 | 10.01 |
| 9.74 | 9.78 | 9.80 | 9.74 | 9.79 | 9.77 |
|  |  | 9.01 | 9.02 |  | 8.99 |
| 8.06 |  |  |  |  |  |
| 7.44 | 7.46 | 7.46 | 7.46 | 7.40 | 7.46 |
| 7.08 | 7.07 | 7.09 | 7.11 |  | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 |  | 5.38 | 5.37 | 5.38 | 5.37 |
| 5.13 | 5.11 | 5.14 | 5.12 | 5.14 |  |
| 4.99 | 5.01 | 5.01 | 5.01 | 5.01 | 5.01 |
|  |  | 4.74 |  |  |  |
| 4.61 | 4.62 | 4.62 | 4.61 | 4.63 | 4.62 |
|  |  | 4.46 | 4.46 |  | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 |  | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
|  | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 |  |  | 3.17 | 3.18 |  |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
|  |  |  |  | 2.97 |  |
|  | 2.95 | 2.95 | 2.94 | 2.95 | 2.95 |
| 2.86 | 2.87 | 2.87 | 2.87 | 2.87 | 2.87 |

TABLE—Continued

| As made | HCl | NaCl | CaCl₂ | ReCl₃ | AgNO₃ |
|---|---|---|---|---|---|
| 2.80 | | | | | |
| 2.78 | | | 2.78 | | 2.78 |
| 2.73 | 2.74 | 2.74 | 2.73 | 2.74 | 2.74 |
| 2.67 | | | 2.68 | | |
| 2.66 | | | 2.65 | | |
| 2.60 | 2.61 | 2.61 | 2.61 | 2.61 | 2.61 |
| | 2.59 | | 2.59 | | |
| 2.57 | | 2.57 | 2.56 | | 2.57 |
| 2.50 | 2.52 | 2.52 | 2.52 | 2.52 | |
| 2.49 | 2.49 | 2.49 | 2.49 | 2.49 | 2.49 |
| | | | 2.45 | | |
| 2.41 | 2.42 | 2.42 | 2.42 | 2.42 | |
| 2.39 | 2.40 | 2.40 | 2.39 | 2.40 | 2.40 |
| 2.39 | 2.40 | 2.40 | 2.39 | 2.40 | 2.40 |
| | | | 2.38 | 2.35 | 2.38 |
| | 2.33 | | 2.33 | 2.32 | 2.33 |
| | 2.30 | | | | |
| | 2.24 | 2.23 | 2.23 | | |
| | 2.20 | 2.21 | 2.20 | 2.20 | |
| | 2.18 | 2.18 | | | |
| | | 2.17 | 2.17 | | |
| 2.13 | | | 2.13 | | |
| 2.11 | 2.11 | | | 2.11 | |
| | | | 2.10 | 2.10 | |
| | 2.08 | 2.08 | | 2.08 | 2.08 |
| | | 2.07 | 2.07 | | |
| | | | 2.04 | | |
| 2.01 | 2.01 | 2.01 | 2.01 | 2.01 | 2.01 |
| 1.99 | 2.00 | 1.99 | 1.99 | 1.99 | 1.99 |
| | | | 1.97 | 1.96 | |
| 1.95 | 1.95 | 1.95 | 1.95 | 1.95 | |
| | | | | 1.94 | |
| | 1.92 | 1.92 | 1.92 | 1.92 | 1.92 |
| 1.91 | | | | 1.91 | |
| | | | | 1.88 | |
| 1.87 | 1.87 | 1.87 | 1.87 | 1.87 | 1.87 |
| | 1.86 | | | | |
| 1.84 | 1.84 | | | 1.84 | 1.84 |
| 1.83 | 1.83 | 1.83 | 1.83 | 1.83 | |
| 1.82 | | 1.81 | | 1.82 | |
| 1.77 | 1.77 | 1.79 | 1.78 | | 1.77 |
| 1.76 | 1.76 | 1.76 | 1.76 | 1.76 | 1.76 |
| | | 1.75 | | | 1.75 |
| | 1.74 | 1.74 | 1.73 | | |
| 1.71 | 1.72 | 1.72 | 1.71 | | 1.70 |
| 1.67 | 1.67 | 1.67 | | 1.67 | 1.67 |
| 1.66 | 1.66 | | 1.66 | 1.66 | 1.66 |
| | | 1.65 | 1.65 | | |
| | | 1.64 | 1.64 | | |
| | 1.63 | 1.63 | 1.63 | 1.63 | 1.62 |
| | 1.61 | 1.61 | 1.61 | | 1.61 |
| 1.58 | | | | | |
| | 1.57 | 1.57 | | 1.57 | 1.57 |
| | | 1.56 | 1.56 | 1.56 | |

Zeolite ZSM-5 can be suitably prepared by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

| | Broad | Preferred | Particularly preferred |
|---|---|---|---|
| OH⁻/SiO₂ | 0.07–1.0 | 0.1–0.8 | 0.2–0.75 |
| R₄N⁺/(R₄N⁺+Na⁺) | 0.2–0.95 | 0.3–0.9 | 0.4–0.9 |
| H₂O/OH⁻ | 10–300 | 10–300 | 10–300 |
| YO₂/W₂O₃ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75° C. to 175° C. for a period of about six hours to 60 days. A more preferred temperature range is from about 90 to 150° C., with the amount of time at a temperature in such range being from about 12 hours to 20 days.

The digestion of the gel particles is carried out until crystals form. The solid product is separated from the reaction medium, as by cooling the whole to room temperature, filtering and water washing.

ZSM-5 is preferably formed as an aluminosilicate. The composition can be prepared utilizing materials which supply the elements of the appropriate oxide. Such compositions include, for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed.

ZSM-8 can also be identified, in terms of mole ratios of oxides, as follows:

$$0.9 \pm 0.2 \; M_{2/n}O : Al_2O_3 : 15\text{-}300 \; SiO_2 : z \; H_2O$$

wherein M is at least one cation, $n$ is the valence thereof and $z$ is from 0 to 40. In a preferred synthesized form, the zeolite has a formula, in terms of mole ratios of oxides, as follows:

$$0.9 \pm 0.2 \; M_{2/n}O : Al_2O_3 : 15\text{-}60 \; SiO_2 : z \; H_2O$$

and M is selected from the group consisting of a mixture of alkali metal cations, especially sodium, and alkylammonium cations, especially tetraethylammonium cations.

Zeolite ZSM-8 can be suitably prepared by reacting a water solution containing either tetraethylammonium hydroxide or tetraethylammonium bromide together with the elements of sodium oxide, aluminum oxide, and an oxide of silica.

The operable relative proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following ranges:

SiO₂/Al₂O₃—from about 10 to about 200

Na₂O/tetraethylammonium hydroxide—from about 0.05 to .020

Tetraethylammonium hydroxide/SiO₂—from about 0.08 to 1.0

H₂O/tetraethylammonium hydroxide—from about 80 to about 200

Thereafter, the crystals are separated from the liquid and recovered. Typical reaction conditions consist of maintaining the foregoing reaction mixture at a temperature of from about 100° C. to 175° C. for a period of time of from about six hours to 60 days. A more preferred temperature range is from about 150 to 175° C. with the amount of time at a temperature in such range being from about 12 hours to 8 days.

ZSM-11 can also be identified, in terms of mole ratios of oxides, as follows:

$$0.9 \pm 0.3 \; M_{2/n}O : Al_2O_3 : 20\text{-}90 \; SiO_2 : z \; H_2O$$

wherein M is at least one cation, $n$ is the valence thereof and $z$ is from 6 to 12. In a preferred synthesized form, the zeolite has a formula, in terms of mole ratios of oxides, as follows:

$$0.9 \pm 0.3 \; M_2O : Al_2O_3 : 20\text{-}90 \; SiO_2 : z \; H_2O$$

and M is selected from the group consisting of a mixture of alkali metal cations, especially sodium, and tetrabutylammonium cations.

ZSM-11 can be suitably prepared by preparing a solution containing $(R_4X)_2O$, sodium oxide, an oxide of aluminum or gallium, an oxide of silicon or germanium and water and having a composition, in terms of mole ratios of oxides, falling within the following ranges:

|  | Broad | Preferred |
|---|---|---|
| $\dfrac{YO_2}{WO_2}$ | 10–150 | 20–90 |
| $\dfrac{Na_2O}{YO_2}$ | .05–0.7 | 0.05–0.40 |
| $\dfrac{(R_4X)_2O}{YO_2}$ | 0.02–0.20 | 0.02–0.15 |
| $\dfrac{H_2O}{Na_2O}$ | 50.800 | 100–600 | wherein $R_4X$ is a cation of a quaternary compound of an element of Group V–A of the Periodic Table, W is aluminum or gallium and Y is silicon or germanium maintaining the mixture until crystals of the zeolite are formed. Preferably, crystallization is performed under pressure in an autoclave or static bomb reactor. The temperature ranges from 100°–200° C. generally, but at lower temperatures, e.g. about 100° C., crystallization time is longer. Thereafter the crystals are separated from the liquid and recovered. The new zeolite is preferably formed in an aluminosilicate form.

An embodiment of this catalyst resides in the use of a porous matrix together with the ZSM-5 type family of zeolite previously described. The zeolite can be combined, dispersed, or otherwise intimately admixed with the porous matrix in such proportions that resulting products contain from 1 to 95% by weight and preferably from 10 to 70% by weight of the zeolite in the final composite.

The term "porous matrix" includes inorganic compositions with which the zeolites can be combined, dispersed or otherwise intimately admixed wherein the matrix may be catalytically active or inactive. It is to be understood that the porosity of the composition employed as a matrix can be either inherent in the particular material or it can be introduced by mechanical or chemical means. Representative of matrices which can be employed include metals and alloys thereof, sintered metals, and sintered glass, asbestos, silicon carbide, aggregates, pumice, firebrick, diatomaceous earths, alumina and inorganic oxides. Inorganic oxide compositions, especially those comprising alumina and those of a siliceous nature are preferred. Of these matrices inorganic oxides such as clay, chemically treated clays, silica, silica alumina, etc. as well as alumina, are particulrly preferred because of their superior porosity, attrition resistance and stability.

Techniques for incorporating the ZSM-5 type family of zeolites into a matrix are conventional in the art and are set forth in U.S. 3,140,253.

It is to be noted that when a ZSM-5 type zeolite is used in combination with a porous matrix, space velocities which may be set forth as parameters for this process are based on the ZSM-5 type zeolite alone and the porous matrix is ignored. Thus, whether a ZSM-5 type zeolite is used alone or in a porous matrix, the space velocities in all cases refer to the ZSM-5 type component.

It is known that zeolites, particularly synthetic zeolites can have their composition modified by impregnating certain metals thereonto and/or thereinto. The composition can also be modified by exchanging various anions and/or cations into the crystal structure of the zeolite, replacing more or less of the ions originally present upon production of the zeolite.

The ZSM-5 type family of zeolites have been found to be especially active for aromatization if they have at least a portion of the original cations associated therewith replaced by any of a wide variety of other cations according to techniques well known in the art. Typical replacing cations would include hydrogen, ammonium, and metal cations, including mixtures of the same. Of the replacing cations, preference is given to cations of hydrogen, ammonium, rare earth, magnesium, zinc, calcium, nickel, and mixtures thereof. Particularly effective members of the ZSM-5 type family of zeolites are those which have been based exchanged with hydrogen ions, ammonium ions, zinc ions or mixtures thereof. Most especially zinc ZSM-5 is the best presently known catalyst for aromatizations as set forth.

Typical ion exchange techniques would be to contact a ZSM-5 type of zeolite with a salt of the desired replacing cation or cations. Although a wide variety of salts can be employed, particular preference is given to chlorides, nitrates and sulfates.

Representative ion exchange techniques are disclosed in a wide variety of patents, including U.S. 3,140,249; 3,140,251; and 3,140,253.

It is also within the scope of the aromatization process to which this application is directed to incorporate a desired metallic component onto the ZSM-5 type family of zeolites by techniques other than ion exchange. Thus, for example, it is possible to impregnate a desired metallic component, such as zinc, platinum or palladium, thereinto by conventional impregnation techniques, as well as merely depositing the elemental metal onto the particular zeolite and in some cases, such as with zinc oxide, to incorporate the metal by physical admixture of the zeolite with an insoluble metal compound.

In any event, following contact with a salt solution of the desired replacing cation, the zeolites are preferably washed with water and dried at a temperature ranging from 150° to about 600° F. and thereafter heated in air or inert gas at temperatures ranging from about 500° F. to 1500° F. for periods of time ranging from 1 to 48 hours or more. It is noted that this heat treatment can be carried out in situ, i.e. while the particular aromatization reaction is taking place, but it is preferred to carry it out as a separate step prior to carrying out the aromatization reaction.

This new aromatization technology is also based on carefully defining process conditions so as to maximize the conversion of aliphatics to aromatics at reasonably high yields. The important basic process parameters are set forth in applications Ser. No. 153,855, now Pat. No. 3,760,024 and Ser. No. 253,942, now Pat. No. 3,756,942, filed respectively on June 16, 1971 and May 17, 1972.

According to these applications the process is carried out at substantially any desired pressure, at a space velocity of up to about 15 WHSV, at a temperature of about 650 to 1500° F., at a conversion of at least about 90% and under such combination of conditions as to assure an aromatics yield of at least 30 weight percent based on the aromatizable portion of the feedstock.

In operating this aromatization process, it has been found that aromatics pass through the system substantially unchanged and that this is a cyclical process in that the catalyst must be regenerated from time to time. It has also been found that, in addition to the fine liquid yields of aromatics, this process produces a rather substantial gas product, which is predominantly short chain paraffins, e.g. methane, ethane and propane, and hydrogen. It has also been discovered that the yield of light paraffinic gases increases with time and with the number of catalyst regenerations (given a constant feedstock composition). Therefore, with time there is a certain diminution of aromatics product in favor of the less valuable light paraffinic gases, particularly propane.

It is therefore an object of this invention to provide a modified aromatization of aliphatics process.

It is another object of this invention to provide an aromatization process having an improved aromatics yield.

It is a further object of this invention to provide a modified aromatization process having a decreased propane yield.

Other and additional objects of this invention will become apparent from a consideration of this entire specification including the claims and drawing hereof.

Figure 2:
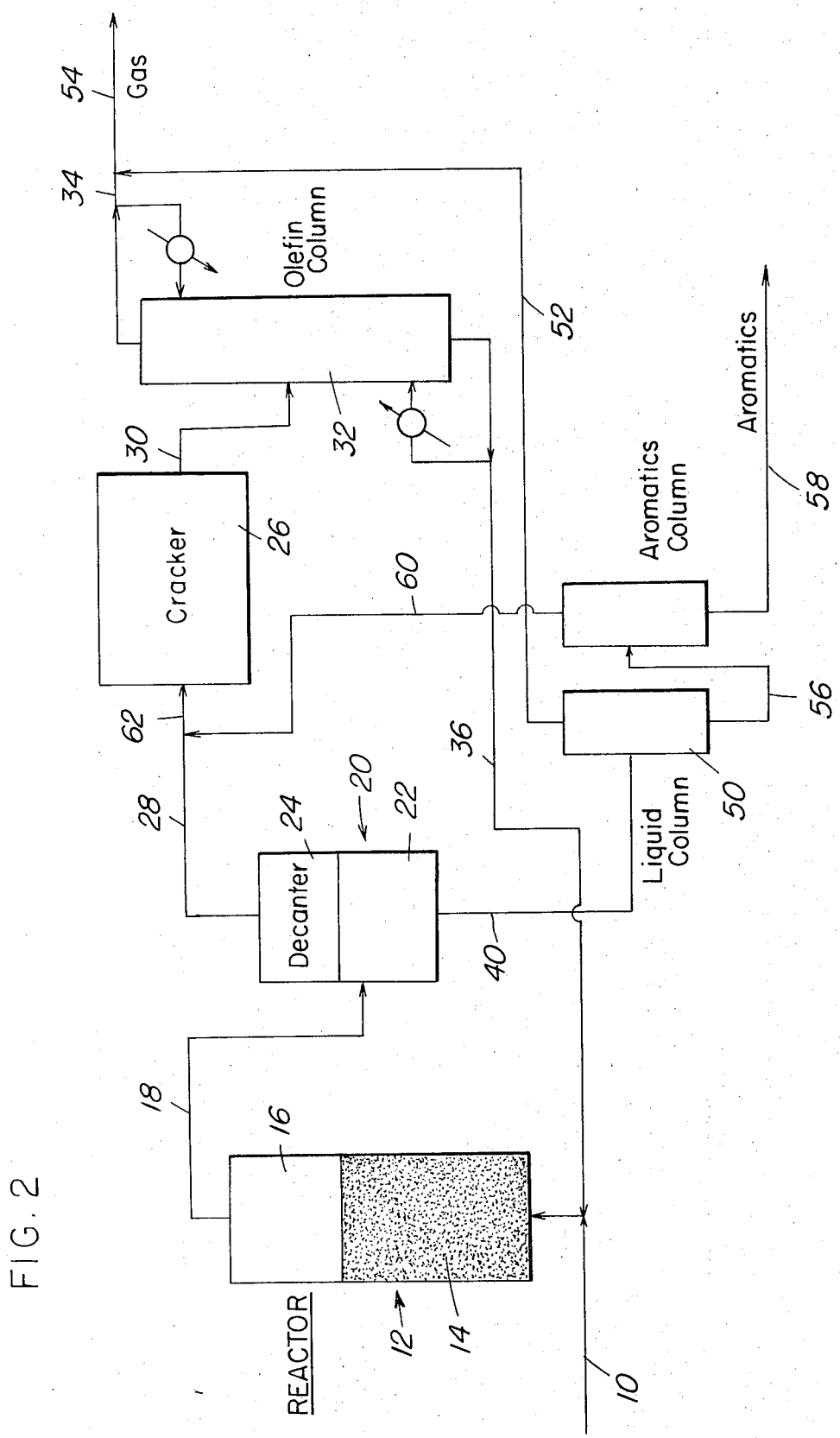

Understanding of this invention will be facilitated by reference to the accompanying drawing in which:

FIG. 1 is a schematic flow diagram of one form of the process of this invention; and FIG. 2 is a schematic flow diagram of a modified form of the process shown in FIG. 1.

In accord with and fulfilling these objects, one aspect of this invention resides in a process comprising charging a feedstock comprising aliphatic hydrocarbons having a boiling point of $C_2$ to 400° F. to a reaction zone maintained at about 650 to 1500° F. and at a pressure of about 0 to 35 atmospheres; contacting such feedstock in the absence of added hydrogen with a ZSM-5 type of catalyst in said reaction zone at a space velocity equivalent to a fixed bed space velocity of about 1 to 15 WHSV to form a mixed gas and liquid product, which gas comprises hydrogen and low molecular weight paraffins and which liquid comprises aromatic hydrocarbons; separating said gas from said liquid; recovering at least the aromatics portion of said liquid product; subjecting the gas product to dehydrogenative cracking conditions to produce a mixture of a gas comprising hydrogen and methane and a fraction comprising olefins; and recycling said olefins fraction into admixture with said feedstock. According to one aspect of this invention the liquid product comprising aromatics can be used as such as a high octane gasoline blend stock. According to another aspect of this invention the liquid product can be treated so as to remove light ends there from which light ends can be fed to the dehydrogenation cracker or to the gas byproduct stream. If desired, heavy ends can be taken from the liquid aromatics product in a distillation or other procedure. As a further alternative, the aromatics product can be resolved into its component compounds, e.g. benzene, toluene, xylene, naphthalene, etc., and these used or sold for chemical use.

The catalyst in the reactor can be in the form of pellets or particles of any convenient size and consistency. The catalyst may be in a fixed or fluidized bed with the feedstock passing upwardly (gas or liquid feed) or downwardly (liquid feed) therethrough. The feedstock can pass over a catalyst bed which may or may not be vibrated. However, this is the least desirable of these three alternatives.

In one other aspect of this invention, the ZSM-5 type catalyst is intentionally predeactivated with respect to part of the feed. In this aspect of this invention the ZSM-5 catalyst is pretreated so as to render it substantially inert with respect to low molecular weight paraffins such as propane and ethane. This can be accomplished by steaming the catalyst for about 20 hours with saturated steam at about 1225° F. It can also be accomplished by utilizing the catalyst to aromatize propane, for an appropriate time at an appropriate temperature, regenerating the catalyst, reusing such, and continuing this cycle until the effectiveness of the catalyst for propane aromatization has diminished sufficiently. This aromatization process can then operate under relatively milder conditions sufficient to aromatize the olefin, naphthene and longer chain paraffin portions of the feedstock, with the lower molecular weight paraffins passing through the aromatization reaction zone substantially unconverted. The paraffins that pass through the aromatization reaction zone become part of the gas product which is then dehydrogenated in a cracking unit.

Paraffin cracking and dehydrogenation to olefins is per se well known in the chemical and petroleum arts. Many plants are in operation around the world for making ethylene and/or propylene plus more or less other olefins such as butene from various feedstocks such as naphtha, propane, butane, mixed ethane and propane, and even methane. These plants are operated utilizing either thermal or catalytic cracking. The most difficult, and therefore the most expensive, part of an olefins cracker is the resolution of the product into ethylene, propylene and other individual compounds of sufficient purity to be used in further chemical processing, particularly polymerization.

According to the art, a feed stream of saturated hydrocarbons, preferably mainly propane or a propane-ethane mixture, is passed, in the gas phase, through a bed of solid catalyst particles. The catalyst may be a Group VI oxide or the like with or without supporting alumina, clay or the like. In the alternative, the paraffinic feed may be passed through a tube furnace at a temperature high enough to sustain thermal cracking, e.g., about 1400° to 2200° F. at 5 to 50 p.s.i.a. With an ethane-propane feedstock, these paraffins may be fed together or separately to a pyrolysis (cracking) furnace. It has been proposed to incorporate in the feed one or more materials which react readily with hydrogen so as to promote the dehydrogenation of the paraffins. These materials include sulfur, sulfurdioxide, nitrogen oxides, etc. The thermal pyrolysis tubes are preferably stainless steel. The cracking catalyst, where used, is preferably chromium oxide, nickel oxide or titanium dioxide on an alumina or ceramic base. The catalytic process operates at about 900 to 1400° F. at slightly elevated pressures of about 1 atmosphere. The catalyst is regenerated in air at about 1100 to 1300° F.

In conventional processing, the gaseous product of a thermal or catalytic dehydrogenation and cracking process is subjected to a very sophisticated work-up and purification technique. The gas product is quenched, compressed, dried and then subjected to a multiple distillation system usually involving at least four (4) and sometimes even six (6) columns. In some product recovery schemes there are also absorption and extraction unit operations. Since sulfur is often used as a hydrogen scavenger, acidic corrosive conditions exist in the purification train requiring the use of large amounts of corrosion resistant equipment.

In contrast to this known state of the art, in the process of the instant invention the olefins product need not be purified to any extent greater than separation of permanent gases, such as hydrogen and methane. The rest of the pyrolysis product is simply recycled to extinction. Since a simple separation of $C_2+$ and $C_1-$ is all that is required for the instant process, this can be accomplished by partial condensation at a temperature which will assure that the final gas product stream contains substantially nothing boiling higher than methane. It is of course unlikely that a 100% pure gas stream of $C_1-$ will be produced. However, this is not of dire consequence since this gas stream is principally used for its heat value rather than further chemical processing.

It is also a remarkable attribute of this process that sulfur values do not seem to adversely effect the ZSM-5 type of aromatization catalyst and therefore sulfur values, used to scavenge hydrogen and drive the pyrolysis reaction, can be recycled through the aromatization reaction zone, if desired, with substantial impunity. Consideration of the relative boiling points of methane, hydrogen sulfide and ethylene indicates that partial condensation of the pyrolysis product sufficient to take out ethylene, propylene and other olefins should also take out hydrogen sulfide. Thus the gas product from this partial condensation should be substantially sulfur free or at least should have relatively a low proportion of sulfur values.

This invention will now be explained with reference to the accompanying drawing and particularly with reference to FIG. 1 thereof. A feed stream 10, which is suitably a mixture of paraffins, olefins and naphthenes which may have some aromatics admixed therewith, is fed into a reactor 12 at least partially filled with catalyst 14. Suitable heat input means (not shown) is provided to maintain the temperature in the reactor at the desired level to convert substantially all of the olefinic and naphthenic portion of the feed stream, and perhaps some of the paraffinic portion of the feed stream to aromatics and to light gases 16. This mixed product 16 passes through a line 18 into a suitable separator 20 by which the aromatics are recovered as a liquid phase 22 and the lighter products are recovered as a gas phase 24. The light gas phase products are fed through a line 28 to a pyrolysis unit 26 in which the light gases, composed mainly of paraffins in the $C_1$ to $C_4$ range, are pyrolyzed to abstract hydrogen and crack the paraffins into olefins of generally average shorter carbon chain length than the paraffin feed. The product 30 from the pyrolysis is resolved 32 into a gas product stream 34 and a recycle olefin rich stream 36. This latter stream 36 is combined with the original fresh feed 10 to make the full feed 38 to the reactor.

The liquid product recovered from the separator 20 passes through a conduit 40 into a flasher or partial condenser 42 where any retained residual gases are vaporized and passed through a conduit 44 into admixture with the gas 34 from the olefin recovery column 32 to form a product gas stream 46. The raffinate 48 from the flasher or partial condenser 42 is highly aromatic, high octane gasoline blend stock.

The modification of the process of this invention shown in FIG. 2 utilizes a fresh feed 10 similar to that used in the process of FIG. 1. The aromatization reactor 12 and catalyst 14 therein are similar to those shown in FIG. 1 as are the gas/liquid product takeoff and resolution to form a gas product 28 and a liquid product 40. In this embodiment of this invention, the processing of the liquid product stream 40 is somewhat different in that it is fed to a first column 50 in which residual gases 52, such as methane and hydrogen, are stripped off and combined with the $C_1-$ gas 34 from the olefin column 32 to form the gaseous product 54. The raffinate 56 from the first column 50 contains substantially all of the aromatics and any $C_6+$ aliphatics which were present in the liquid product of aromatization. This raffinate 56 is then subjected to resolution in an aromatics column to separate the aromatics 58 from the aliphatics 60. This separation may be by fractional distillation, fractional crystallization, solvent extraction or otherwise (not particularly shown) as is in the prior art. The aliphatics stream 60 is substantially saturated and is combined with the gas product stream 28 from aromatization as a mixed feed 62 to the cracker 26.

The liquid product resulting from this process is a mixture of benzene, toluene, xylenes and ethyl benzenes with lesser amounts of other polyalkyl benzenes and some fused ring aromatics such as naphthalene and various alkyl naphthalenes. The gas product resulting from this process is predominantly methane and hydrogen with lesser amounts of carbon oxides and higher paraffins. Other minor impurities may exist in either the liquid or the gas product stream.

This invention will be illustrated by the following examples which are non-limiting on the scope of this invention and in which parts and percentages are by weight unless expressly stated to the contrary.

EXAMPLE 1

400 parts of a fresh feedstock having a clear research octane number of about 37 composed of 67 wt. percent normal heptane and 33 wt. percent benzene is admixed with 100 parts of a recycle stream of the following compositions:

|          | Percent wt. |
|----------|-------------|
| Ethylene | 13 |
| Ethane   | 15 |
| Propylene | 56 |
| Propane  | 16 |

The mixture is fed at a rate of 500 parts wt. per hour through a bed of Zn ZSM-5 aromatization catalyst. The space velocity is 2 WHSV, the temperature is 950° F. and the pressure is atmospheric. The product is separated into 162 parts per hour of gas and 338 parts per hour of liquid gasoline blend stock which is 97% aromatics with a clear research octane number of 110.

The gas is about 4 wt. percent hydrogen and about 80 wt. percent $C_1-C_3$ paraffins.

EXAMPLE 2

Product gas from Example 1 is fed to a thermal pyrolysis unit operating at 1500–1650° F. A product stream as shown in Table 3 containing about 42% $C_2-C_3$ olefins is evolved. The olefin portion of this pyrolysis product is recycled as aforesaid while the $C_1-$ gas fraction is combined with gas evolved from the aromatics rich liquid product to form a methane/hydrogen rich product gas at a rate of 63 parts per hour.

TABLE 3

|        | Charge | Aromatiz prod. total | Pyrolysis product | Recycle |
|--------|--------|----------------------|-------------------|---------|
| $H_2$  |        | 7                    | 7                 |         |
| $C_1$  |        | 56                   | 56                |         |
| $C_2^=$ | 13    | 8                    | 13                | 13      |
| $C_2$  | 15     | 20                   | 15                | 15      |
| $C_3^=$ | 56    | 19                   | 56                | 56      |
| $C_3$  | 16     | 52                   | 16                | 16      |
| $nC_7$ | 300    |                      |                   |         |
| Benzene | 100   | 100                  |                   |         |
| Total lig |      | 238                  |                   |         |
| Mat bal | 500   | 500                  |                   |         |

What is claimed is:
1. A process comprising:
  (A) feeding a composition comprising at least one member selected from the group consisting of olefins, naphthenes and long chain paraffins to an aromatization zone containing a ZSM-5 type of catalyst at a space velocity equivalent to about 1 to 15 WHSV and a temperature of about 650 to 1400° F.;
  (B) maintaining said composition in said aromatization zone for a time and under conditions sufficient to convert at least 90% of said composition to a product containing at least a 30 weight percent yield of liquid form aromatics and a gas;
  (C) resolving said aromatization product into a liquid phase product and a gas phase product wherein said gas phase product is preponderantly paraffins and said liquid phase product is preponderantly aromatics;
  (D) pyrolyzing and dehydrogenating said gas phase product to produce a mixture comprising olefins and $C_1-$ gas;
  (E) recycling said olefins from step D into admixture with said feed composition to said aromatization; and
  (F) recovering a liquid, high octane, substantially aromatic product and a gaseous, substantially methane and hydrogen, product.

2. A process as claimed in claim 1 wherein said feed composition additionally contains paraffins and aromatics.

3. A process as claimed in claim 1 wherein said aromatization catalyst is Zn ZSM-5.

4. A process as claimed in claim 1 wherein the liquid phase product of aromatization is resolved to remove substantially all residual gas therefrom which residual gas is admixed with said gas product.

5. A process as claimed in claim 1 wherein said aliphatic components are resolved to provide a $C_6+$ fraction which is fed to said step D.

6. A process as claimed in claim 1 wherein said pyrolyzing is catalytic.

7. A process as claimed in claim 1 wherein said pyrolyzing is thermal.

References Cited

UNITED STATES PATENTS

| | | | |
|---|---|---|---|
| 3,542,667 | 11/1970 | McMahon et al. | 208—66 |
| 3,556,987 | 1/1971 | Zimmerman et al. | 208—66 |

HERBERT LEVINE, Primary Examiner

U.S. Cl. X.R.

48—197 R, 211

PO-1050
(5/69)

UNITED STATES PATENT OFFICE
CERTIFICATE OF CORRECTION

Patent No. 3,813,330          Dated May 28, 1974

Inventor(s) EDWIN N. GIVENS, CHARLES J. PLANK and EDWARD J. ROSINSKI

It is certified that error appears in the above-identified patent and that said Letters Patent are hereby corrected as shown below:

Column 2, line 44 before table insert --

Table II

X-Ray Diffraction
    ZSM-5 Powder in Cation
    Exchanged Forms
    d Spacings Observed --

Column 3, line 13 omit, line repeated.

Signed and sealed this 12th day of November 1974.

(SEAL)
Attest:

McCOY M. GIBSON JR.          C. MARSHALL DANN
Attesting Officer          Commissioner of Patents